United States Patent

Vrouwenvelder

Patent Number: 6,039,993
Date of Patent: Mar. 21, 2000

[54] DEVICE AND METHOD FOR FORMING A STRAND OF DOUGH

[75] Inventor: Cornelis Carinus Vrouwenvelder, 's-Hertogenbosch, Netherlands

[73] Assignee: Kaak, Johan Hendrik Bernard, Gaanderen, Netherlands

[21] Appl. No.: 08/981,390

[22] PCT Filed: Jun. 11, 1996

[86] PCT No.: PCT/NL96/00232

§ 371 Date: Mar. 18, 1998

§ 102(e) Date: Mar. 18, 1998

[87] PCT Pub. No.: WO97/00615

PCT Pub. Date: Jan. 9, 1997

[30] Foreign Application Priority Data

Jun. 22, 1995 [NL] Netherlands ............................ 1000637

[51] Int. Cl.[7] .................................. A21C 3/00; A21D 6/00
[52] U.S. Cl. ...................... 426/496; 425/371; 425/364 R; 426/500
[58] Field of Search ...................................... 426/500, 502, 426/517, 496; 425/371, 372, 364 R; 99/450.1

[56] References Cited

U.S. PATENT DOCUMENTS

| 3,121,406 | 2/1964 | Kiefaber | 107/9 |
| 4,767,638 | 8/1988 | Uhrovic | 425/372 |
| 5,538,414 | 7/1996 | Kobayashi et al. | 425/371 |

FOREIGN PATENT DOCUMENTS 9142037  6/1994  WIPO .

*Primary Examiner*—George C. Yeung
*Attorney, Agent, or Firm*—Ladas & Parry

[57] ABSTRACT

A method and device for forming a strand of dough from a relatively short dough body by providing a first conveyor belt having a first dough contact face and second conveyor belt having a second dough contact face, keeping the two dough contact faces spaced in order to define a transforming space for the dough body, placing the dough body on the first dough contact face of the first conveyor belt at rest and in the transforming space, subsequently driving the first conveyor belt while the second conveyor belt is at rest, and driving the second conveyor belt while the first conveyor belt is at rest, wherein the first conveyor belt is driven exclusively in one direction and the second conveyor belt is driven exclusively in one direction, whereby the resulting dough strand is stress-free and can maintain a straight shape.

3 Claims, 1 Drawing Sheet

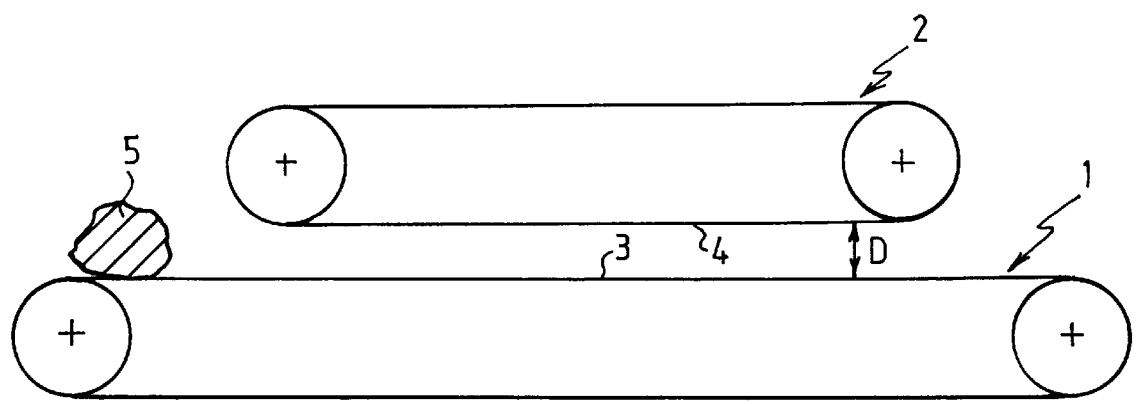

DEVICE AND METHOD FOR FORMING A STRAND OF DOUGH

The invention relates to a device for forming a strand of dough from a relatively short dough body, comprising a first conveyor belt and a second conveyor belt, which are respectively provided with first and second dough contact faces facing each other, means for keeping the two dough contact faces spaced in order to define a transforming space for the dough body, and driving means for driving the conveyor belts. The invention also relates to a method for forming a strand of dough from the aforesaid dough body.

A device for forming a strand of dough is known, which comprises two conveyor belts, each of which is provided with a dough contact face and driving means. The dough contact faces of the conveyor belts facing each other are spaced at a distance d from each other and extend substantially parallel to each another. Both contact faces define a transforming space, in which an end of the interspace forms the intake space for the dough body, and the other end forms the discharge or issue end for the dough strand. When in action the lower conveyor belt is driven such that the dough contact face thereof moves continuously in one direction along the interspace and the upper conveyor belt is driven such that the dough contact face thereof moves along the interspace in the opposite direction. The lower conveyor belt is driven at a higher speed than the upper conveyor belt, When the dough body, the thickness of which is greater than the spacing between the conveyor belts, is placed on the moving dough contact face of the lower conveyor belt, it is fed to the interspace by this contact face. Having arrived there the dough body is subjected to rotation by the upper contact face moving in the opposite direction. On account of the difference i-n direction and size of the belt speeds, together with the pressure exerted by the contact faces, the dough body is formed into a round dough strand.

Practice has shown that already during formation and during further treatment a thus formed dough strand does not display a straight shape. When the dough strand falls off the conveyor belt, for example, which happens regularly in mechanical dough processing, for example when transferring to another conveyor belt, it assumes a Ω-shape. Such a shape is very undesirable for further processing into the final bread product.

It has been shown that a dough strand formed in this way is torsioned compared to the original material. With the known device a torque is exerted on the dough in the body during the passage of the latter through the interspace, this also being as a result of the diameter variation of the original material, the dough having considerable torsional stresses just before leaving the interspace as a consequence. At the moment that the dough strand leaves the interspace, these stresses are relieved at least to some extent, with the result that the strand of dough abandons the stretched shape. Because of the distortion of the cross sectional faces with regard to one another in the dough body, the structure of the dough is also adversely affected.

In addition it has been found that placing the dough body on the moving first conveyor belt can already entail deformations of the dough body and that because of the continuous drive of the conveyor belts the synchronisation with later treatment to the dough body is difficult to realize.

It is now an object of the invention to provide, among other things, a device and a method for forming modelled dough portions of, in particular, a relatively large length, the so-called dough strands, which stay almost straight during further treatment, and eventually supply an almost straight bread product, for instance a French loaf. An object of the invention is, moreover to provide a simple device and method with which a correct synchronisation with other dough treatments can be obtained in a cheap manner.

For this purpose the invention provides a device for forming a strand of dough from a relatively short dough body of the kind named in the preamble, characterized in that the driving means are driving means for driving the first and the second conveyor belt in turn and exclusively in one direction.

In this way, in turn, the first conveyor belt is driven while the second conveyor belt is at rest and the second conveyor belt is driven while the first is at rest. Thus the dough body, on its way to its shape as a strand of dough can be rolled or rotated in each cross section substantially as much in the one direction as in the opposite direction. Thus, almost no torsion is introduced into the dough strand, so that the strand of dough, which exits the discharge end retains its straight shape, is almost homogenous in thickness and structure over its entire length and can, in a great many cases, already have reached its eventual length. Moreover, the strand of dough is much more flexible, which enhances possible further treatment thereof, for instance bringing it to the eventual desired length, with the desired tolerances. In addition, the dough body can be placed on and removed from a stationary conveyor belt, which can simplify the synchronisation with other dough treatments.

According to another aspect of the invention a method is provided for forming a relatively short piece of dough into a strand of dough, characterized in that the piece of dough is placed on a first conveyor belt at rest and that subsequently the first conveyor belt and a second conveyor belt spaced thereabove are driven in turn aid exclusively in one direction.

Preferably the movement of each conveyor belt during each drive is approximately $2\pi$ times the mutual sparing. It has been shown that with this an optimally modelled strand of dough can, in general, be obtained. Emphasis is laid on the words "in general" because the composition of the dough can vary considerably, for example in view of the different end products.

Some embodiments of the invention will be described by way of example on the basis of the drawing, in which the sole FIGURE schematically shows a side view of the embodiment of the device according to the invention for forming a strand of dough.

The embodiment shown in the sole FIGURE of the device according to the invention comprises two conveyor belts 1, 2 with dough contact faces 3 and 4, respectively, facing each other. The two conveyor belts 1, 2 are held in an assembly, which is not shown, in such a way above each other that the dough contact faces 3, 4 are at a spacing D from each other. The conveyor belts 1, 2 are driven by driving means, not shown, in such a way that a dough body 5 placed on the conveyor belt 3 is transported from the left in the FIGURE to the right in the FIGURE. The spacing D is chosen such that a quantity of dough to be formed into a strand of dough undergoes a pressure if this quantity of dough is in the interspace, the forming space, between the dough contact faces 3 and 4.

The device shown in the FIGURE works as follows. The dough body 5 is placed on the stationary conveyor belt 1 so that as little deformation as possible is introduced into the dough body 5. Subsequently the conveyor belt 1 is driven by the drive means exclusively and temporarily in direction such that the dough body 1 is moved over a certain distance to the right (as seen in the FIGURE). During this driving of the conveyor belt 1 the conveyor belt 2 is at rest. When the dough body is in the forming space during this movement it undergoes an anti-clockwise rotation Then the conveyor belt 1 is temporarily stopped and the conveyor belt 2 is exclusively driven in a direction such that the dough body 5 is moved over a certain distance to the right (as seen in the FIGURE). Now the dough body 5 undergoes a clockwise rotation. By thus driving, the conveyor belts in turn and exclusively in one direction, the dough body 5 is continuously rotated in the opposite direction, whereby the dough strand is stress-free and can maintain its straight shape during further treatment.

Finally, the strand of dough can be removed from the stationary conveyor belt 1.

The drive of the conveyor belts can be such that at each drive another quantity of dough to be moved can be obtained, but preferably a movement of 2 πD or roughly twice the circumference of the strand of dough to be formed is realized during each drive, Consequently, the quantity of dough to be formed into a strand of dough is in each case rolled twice in the one direction and then twice ir the opposite direction. A suchlike amplitude seems, broadly speaking, to give an optimally modelled strand of dough, although for certain dough qualities amplitudes of πD could also yield optimal results.

Because the dough can be placed on a stationary conveyor belt and be removed from it, a further dough treatment is easy to synchronize with the drive of the conveyor belts, as a result of which, also because only one drive is needed in one direction, the, device can be realized in a cheap way.

I claim:

1. Device for forming a strand of dough from a relatively short dough body, consisting of a first conveyor belt and a second conveyor belt, which are respectively provided with first and second dough contact faces facing each other, means for keeping the two dough contact faces spaced in order to define a transforming space for the dough body, and driving means for driving the first conveyor belt while the second conveyor belt is at rest and for driving the second conveyor belt while the first conveyor belt is at rest and for driving the first conveyor belt exclusively in one direction and the second conveyor belt exclusively in one direction, whereby the resulting dough strand is stress-free and can maintain a straight shape.

2. Method for forming a relatively short piece of dough into a strand of dough, comprising the step of providing a first conveyor belt having a first dough contact face and a second conveyor belt having a second dough contact face, the dough contact faces being at a spacing from each other in order to define a transforming space for the piece of dough, the step of placing the piece of dough on the first dough contact face of the first conveyor belt at rest and in the transforming space, the step of subsequently driving the first conveyor belt while the second conveyor belt is at rest, and the step of driving the second conveyor belt while the first conveyor belt is at rest, in which the first conveyor belt is driven exclusively in one direction and the second conveyor belt is driven exclusively in one direction, whereby the resulting dough strand is stress-free and can maintain a straight shape.

3. The method according to claim 2, wherein the conveyor belts are moved approximately 2 π times the transforming space spacing during each driving.

* * * * *